United States Patent [19]

Rittenhouse

[11] 3,826,138
[45] July 30, 1974

[54] THRUST BEARING
[75] Inventor: Howard E. Rittenhouse, Rogers, Ark.
[73] Assignee: Crane Co., New York, N.Y.
[22] Filed: Jan. 29, 1973
[21] Appl. No.: 327,464

[52] U.S. Cl. ............................................... 73/258
[51] Int. Cl. ............................................. G01f 3/08
[58] Field of Search ...................... 73/258; 418/49

[56] References Cited
UNITED STATES PATENTS
1,880,195   10/1932   Chrisman ............................ 73/258
2,960,074   11/1960   Zavada ................................ 73/258
3,100,993    8/1963   Wetjen ................................ 73/258

Primary Examiner—Herbert Goldstein

[57] ABSTRACT

A thurst bearing insert positioned in a measuring chamber having an arcuate slot thereon adapted to receive and guide the thrust roller of a nutating disc when the disc is nutated by fluid passing through the meter.

3 Claims, 5 Drawing Figures

PATENTED JUL 30 1974 3,826,138
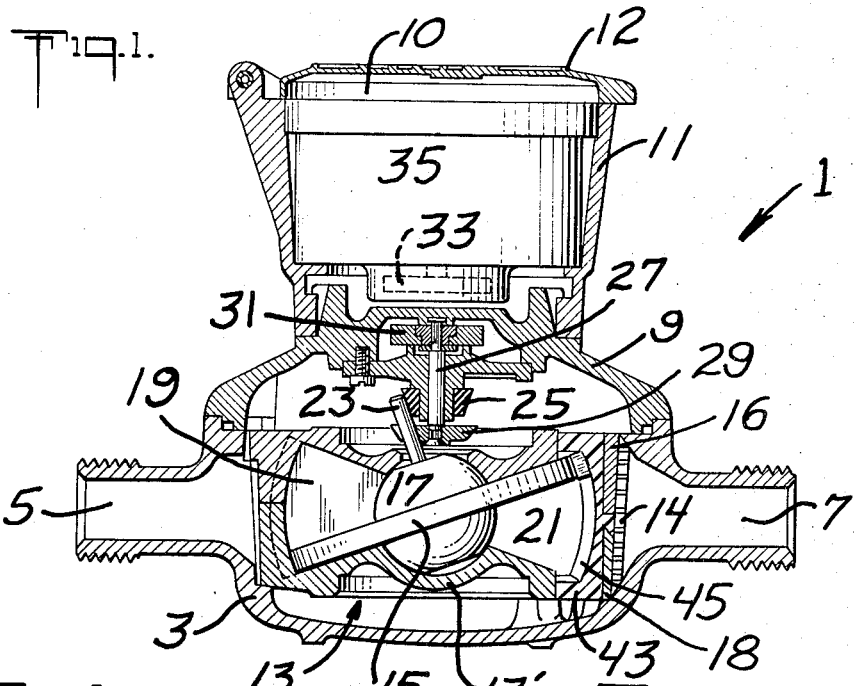
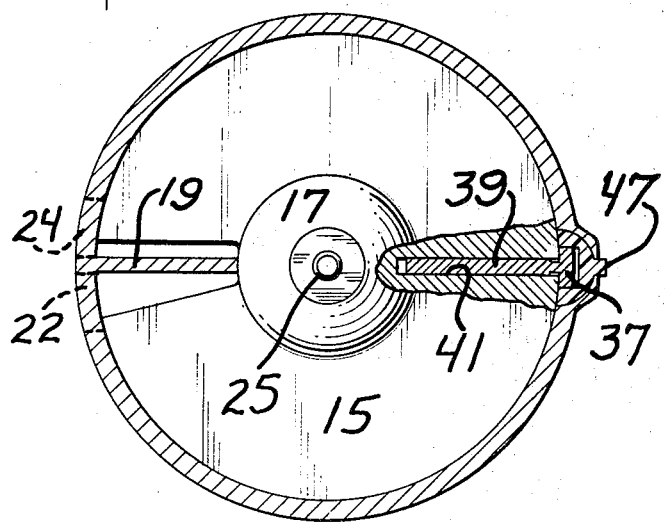
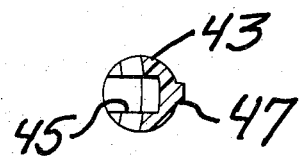
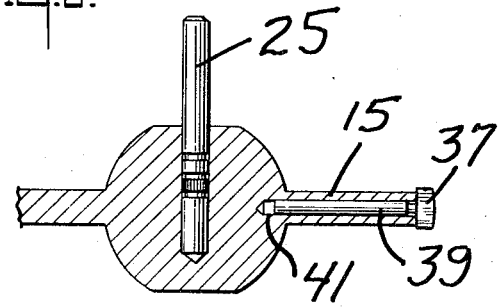
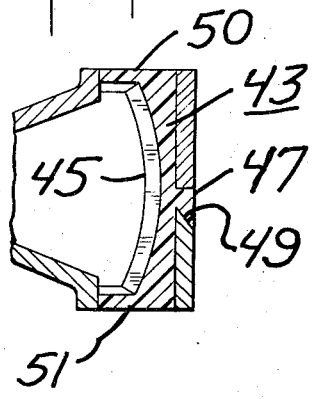

THRUST BEARING

This invention relates to fluid meters and in particular to improvements in thrust bearings in meters utilizing a nutating disc for measuring the flow of fluid through the metering chamber.

Fluid meters which utilize a nutating disc to measure the flow of fluid through the metering chamber whereby fluid passing through the metering chamber imparts a nutating motion to the disc which is converted in rotary motion to actuate a counter or register are well known. The incoming fluid, which is under pressure, provides sufficient thrust to actuate the nutation of the disc. The disc is usually supported in a measuring chamber, which is constructed of two complementary sections which house said disc and comprise the measuring chamber. A partition plate in the measuring chamber separates the inlet from the outlet so that all fluid passing through the chamber is thus metered. The pressure and velocity of fluid entering the metering chamber impart considerable thrust on the nutating disc, which thrust is transmitted to the measuring chamber housing where contact between the two elements is maintained. This thrust caused by the fluid must be counteracted to insure accuracy and proper functioning of the meter. A common means of countering such thrust is the use of a thrust roller, which is positioned on the disc diametrically opposite the partition plate of the measuring chamber, and is adapted to roll along a slot in the measuring chamber housing. Such slots presently utilize various types of bearing liners which are placed within the slot in proximity to the roller to thus provide a smooth track for the roller, minimize wear and reduce friction, which would impede proper nutation of the disc. These liners are replaceable and are of common use in nutating disc type metering devices which are used by many municipalities for metering water used by subscribers. The complex machining of the internal portion of the measuring chamber housing to accommodate the thrust roller and bearing contributes significantly the cost of the meter. Because of the accuracy required to position such roller and bearing liner, it is also a source of problems in the assembly of meters. Such thrust roller arrangement, if improperly machined, also provides a bypass for the fluid passing through the metering chamber thereby resulting in metering inaccuracy. Additionally, the slot which accommodates the replaceable bearing liner is of unconventional configuration since the movement of such thrust bearing in a disc which is nutating generates a complex arc which requires special tooling to produce. The slot is also internal to the chamber which greatly increases the machining difficulty. The measuring chamber housing is often, but not necessarily limited to, a brass, or metal composition, and, the chamber is composed of two parts which mate together forming a chamber which encloses the nutating disc. It is obvious that since the slot which accommodates the bearing liner and roller is generated in two separate components which are subsequently assembled, a high degree of accuracy is required to prevent misalignment, and, the elimination of this complex machining in both sections of the metering chamber housing would be advantageous. Additionally, the scrap rate on such machining operation is high, and, the replacement of bearing liners for such slots is a time consuming and expensive operation which has been experienced with a high degree of difficulty in the industry. Numerous patents relating to thrust rollers and/or their respective bearing liners have attempted to minimize the problem, as illustrated in U.S. Pat. Nos. 2,960,074 and 3,100,933. However, in each instance a precision liner is placed within the thrust roller slot, the latter of which required a high degree of precision machining to prepare the slot to accept the liner.

It is the principal object of the instant invention to provide a novel thrust bearing insert which will eliminate the complex tooling and machining heretofore necessitated in the thrust bearing slot of nutating disc metering devices.

Still another object of the invention is to provide a thrust bearing insert for a nutating disc which provides reliable performance and is simple to replace.

The instant invention also provides a thrust bearing insert which acts as a dowl between chamber halves for aligning them and assisting the securing of the halves.

Another object of the novel bearing insert, which is without a joint in its length of travel for the thrust roller, is that it provides a smooth path between the thrust roller head and the insert whereby no offset effect between the metering chamber portions is presented.

Another object is the provision of a bearing insert which fits closely into drilled holes positioned in the metering chamber and which is dovetailed into a secure position.

The bearing insert described herein replaces the conventional thrust roller liner which is inserted between the metering chamber halves on one side of a precisely machined metering chamber slot which accommodates a thrust roller positioned on a nutating disc whereby the incoming fluid pressure forces the roller against the liner as the roller follows the arcuate, vertical path of the liner during the nutating action of the disc wherein the roller and liner absorb the thrust forces imposed by the incoming fluid. This is accomplished by the utilization of a thrust roller insert which is of cylindrical configuration and which is molded of plastic or similar materials whereby the dimensions and tolerance of the slot can be accurately controlled during molding to thereby eliminate the intricate machining previously necessitated in the mating portions of the metering chamber housing. The insert is placed within a drilled hold, which requires an inexpensive and expendable fixture set-up whereby the intricate components are molded within the insert and the insert is merely positioned within the housing to accommodate the thrust roller.

These and other objects of the invention will become apparent from the following description when read in conjunction with the appended claims and accompanying drawings, wherein:

FIG. 1 is a vertical, sectional view of a fluid meter showing the internal construction of the metering casing and disc chamber;

FIG. 2 is an enlarged cross-sectional view through the metering chamber taken along line 2—2 of FIG. 1 also showing a partial cross-sectional view of the nutating disc and thrust roller assembly;

FIG. 3 is a partial cross-sectional view through the nutating disc taken through the ball and thrust roller;

FIG. 4 is a top view of the bearing insert; and,

FIG. 5 is an enlarged partial cross-sectional view of the metering chamber taken through the axis of the bearing insert.

With reference to the drawings and in particular FIG. 1, a fluid meter, generally indicated at 1, has a lower housing 3 with inlet and outlet conduit connections 7 and 5, respectively. Upper housing 9, which extends from housing 3, has a register housing 11 extending therefrom, the latter housing being separated from the meter housings 3 and 9 in the usual manner to prevent fluid from entering housing 11. Housing 11 has the usual cover 12 pivotally mounted, as shown, to permit visual observation of the dial 10 of the register which indicates the quantity of fluid passed through the meter. The housing 11 contains the usual register, not shown.

Lower housing 3 has a measuring chamber 13 which is internally secured to the housing 3 by a sealing and locking taper on both the housing and chamber. Chamber 13 is composed of two parts, 16 and 18, representing upper and lower portions of the chamber 13, respectively. Screen 14, functions as a filter to prevent foreign particles from entering the chamber. Chamber 13 contains a disc member 15, having an integral central ball portion 17 which supports the disc, on a complementary contour 13' formed on the lower chamber portion 13, as shown in FIG. 1, for its nutating action within the internal portion 21 of chamber 13 in a well known manner. Division plate 19, note FIG. 2, divides the internal portion 21 of chamber 13, to form a division wall between the inlet 22 and outlet 24 of said chamber. Inlet 22 and outlet 24 are in communication with inlet and outlet conduits, 7 and 5, respectively, of lower housing 3.

As incoming fluid is admitted through conduit 7, it enters the inlet 22 of metering chamber 13. Disc 15 undergoes its well known nutating movement as fluid passes through the internal portion 21 of chamber 13 to meter the fluid. Disc 15 is provided with the usual drive spindle 23 which is secured to the ball 17, as shown. Spindle 23 rotates around cone bearing 25 and transmits a rotary motion to drive shaft 27 by means of dog 29 which is secured to one end of shaft 27. The other end of shaft 27 has a magnet 31 affixed thereto whereby it transmits rotary motion to a second magnet 33 which is positioned in a sealed register casing 35 to form a magnetic coupling between the register and meter to thereby provide a driving connection for the register, not shown, which is located in casing 35. The register enables visual indication of the quantity of flow through the meter.

The above elements heretofore described are of well known construction and are identified to provide a background for the novel thrust roller insert which comprises the essence of the subject invention. With reference to FIG. 2, nutating disc 15 has a central ball or sphere portion 17 which provides a means of supporting said disc and enables the disc to function in its nutating manner. Partition plate 19, which separates the inlet 22 from the outlet 24 of measuring chamber 13, is secured to or integral with the said chamber so that there is no relative movement between the said partition plate and chamber. Directly opposite partition plate 19, on the other side of sphere portion 17, is a thrust roller 37 having shank 39 which is journalled in bore 41. The bore 41 is radially formed in the disc, as shown in FIGS. 2 and 3 to permit the thrust roller 37 to be freely rotatable therein as the disc nutates and the roller follows the path provided by the bearing insert, as described hereinafter.

The bearing insert 43, to which this invention is directed, is of cylindrical configuration and is molded plastic or similar composition which may be readily formed with a high degree of accuracy.

The bearing insert 43 is formed with an arcuate slot 45 therein which provides a guide for thrust roller 37, the latter of which is journalled in disc 15, and is free to roll and reciprocate therein. As shown in FIG. 1, the slot 45 is arcuate in nature as it is formed such that a radius is generated from disc 15 which is pivoted on ball 17. Thus, the arc formed in the bearing insert by slot 45 is performed with a high degree of accuracy in molding to maintain the dimensional tolerance necessary, and, a high degree of accuracy is achieved by molding them heretofore provided by machined slots in the metering housing, per se. Insert 43 has a dovetail segment 47 which mates with slot 49 in the lower portion 13 of the metering housing to locate the bearing insert positively. Upon assembly of the upper and lower portion of the metering housing, the dovetail will assure the perfect alignment of the two sections of the metering chamber thereby providing an accurate guide for the thrust roller 37 when the disc 17 is nutated by the passage of water through the metering chamber 21. Bearing insert 43 also has end portions, 50 and 51, respectively, which prevent the loss of fluid from the chamber 21 as these ends are in fluid-tight relationship with top and bottom portions 16, 18, respectively, of the chamber 21.

It will thus be seen that bearing insert 43 thereby provides a simple, accurate, and economical means of guiding thrust roller 37 in a heretofore complex and expensive machining provision which included a liner whereby the accuracy is now achieved by the molding of the slot within high tolerance limits. The bearing is also positively locked within the section of metering housing to insure an accurate path for the thrust roller as it absorbs the forces imposed by the incoming fluid metered in the metering chamber by the nutating disc.

I claim:

1. In a nutating disc fluid meter, the combination including:
   a. a measuring chamber, including an upper and lower portion, having an inlet and outlet;
   b. a partition plate in said chamber separating said inlet from said outlet;
   c. a nutating disc positioned in said chamber having a ball portion supporting said disc for nutation, said disc having a radial bore therein positioned diametrically opposite said partition plate;
   d. a thrust roller extending from the periphery of said disc, said thrust roller having a shank portion journalled in said radial bore;
   e. a recess in said chamber in proximity to said thrust roller; and,
   f. a substantially cylindrical bearing insert positioned in said recess in proximity to said thrust roller, said insert having an arcuate slot therein adapted to receive and guide said thrust roller when said disc is nutated by fluid passing through the meter, said insert having end portions in fluid tight relationship with said upper and lower portion, said insert including means adapted to be secured between said upper and lower portions to align said insert and to prevent relative movement between said insert and said portions.

2. A nutating disc fluid meter as recited in claim 1 wherein said means includes a protruding dovetailed portion positioned between said upper and lower portions of said chamber.

3. A nutating disc fluid meter as recited in claim 1 wherein said arcuate slot is positioned between the end portions of said insert along the longitudinal axis of said cylinder.

* * * * *